United States Patent [19]

Stockinger

[11] Patent Number: 4,883,855
[45] Date of Patent: Nov. 28, 1989

[54] ETHYLENICALLY UNSATURATED POLYETHER SULFONE OR POLYETHER KETONE COPOLYMER

[75] Inventor: Friedrich Stockinger, Courtepin, Switzerland

[73] Assignee: Ciba-Geigy Corporation, Ardsley, N.Y.

[21] Appl. No.: 299,291

[22] Filed: Jan. 23, 1989

[30] Foreign Application Priority Data

Feb. 1, 1988 [CH] Switzerland .............................. 337/88

[51] Int. Cl.$^4$ ............................................. C08G 65/48
[52] U.S. Cl. ................................... 528/171; 524/611; 525/471; 525/534; 525/535; 525/539; 528/125; 528/170; 528/174; 528/192
[58] Field of Search ................ 528/170, 173, 174, 192, 528/171, 125

[56] References Cited

U.S. PATENT DOCUMENTS

| 4,414,269 | 11/1983 | Lubowitz et al. |
| 4,536,543 | 8/1985 | Matzner et al. |
| 4,634,742 | 1/1987 | Percec ................................. 525/390 |
| 4,661,604 | 4/1987 | Lubowitz et al. |
| 4,762,869 | 8/1988 | Heinz et al. |
| 4,762,906 | 8/1988 | Hisgen et al. ........................ 528/173 |

FOREIGN PATENT DOCUMENTS 0106023  4/1984  European Pat. Off.
0247512 12/1987  European Pat. Off.

Primary Examiner—Harold D. Anderson
Assistant Examiner—T. Mosley
Attorney, Agent, or Firm—Stephen V. O'Brien

[57] ABSTRACT

The invention relates to copolyether resins having end groups —$OR^1$ linked direct to phenyl nuclei and containing 1 to 50 mol % of repeating structural units of formula I

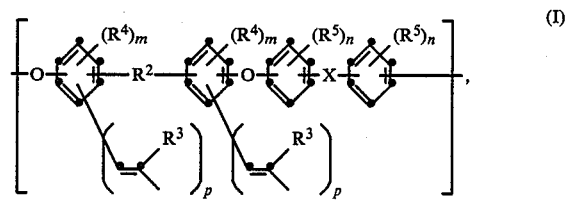

and 99 to 50 mol % of repeating structural units of formula II

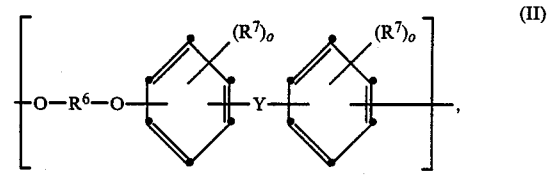

wherein $R^1$ is hydrogen, a phenylene radical substituted by amino groups or ethylenically unsaturated radicals or is a 2,3-epoxypropyl radical, $R^2$ is a direct C—C bond or a group of formula —$C_rH_{2r}$—, —O—, —S—, —CO— or —$SO_2$—, r is 1 to 20, $R^3$ is hydrogen or methyl, $R^4$, $R^5$ and $R^7$ are inert substituents, m, n and o are each independently 0, 1 or 2, p is 1 or 2, $R^6$ is a radical of a bisphenol, X and Y are —$SO_2$— or —CO—.

The compounds can be used in particular in conjunction with unsaturated imides as matrix resins for the preparation of fibrous composite structures.

9 Claims, No Drawings

ETHYLENICALLY UNSATURATED POLYETHER SULFONE OR POLYETHER KETONE COPOLYMER

The present invention relates to novel curable polyether sulfone or polyether ketone copolymers.

Aside from their known technical advantages, polyether resins—like other thermoplastics—suffer from the drawbacks of a pronounced tendency to creep under load at elevated temperature and also of an insufficient resistance to organic solvents.

There has been no lack of attempts to remedy these shortcomings by end-capping polyether polymers with reactive end groups that effect crosslinking. Such end groups are the maleimidyl, nadicimidyl or ethynyl groups disclosed, for example, in European patent application A-67 976.

Polyarylene ethers which contain at least two ethenyl or ethynyl groups in the polymer backbone and additionally contain end groups of this type are disclosed in U.S. patent specification 4 634 742.

Selected copolyether sulfones and copolyether ketones have now been found which, by themselves or together with specific unsaturated imides, can be processed to cured products. These products combined desirable thermoplastic properties such as high impact strength and flexural strength, and desirable properties of thermoset resins such as high glass transition temperatures and good resistance to solvents.

The present invention specifically relates to copolyether resins having end groups —OR$^1$ linked directly to phenyl nuclei and containing 1 to 50 mol % of repeating structural units of formula I

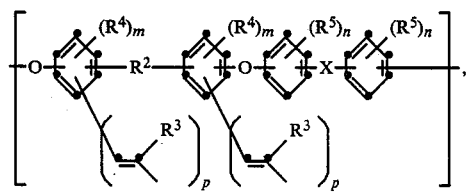

and 99 to 50 mol % of repeating structual units of formula II

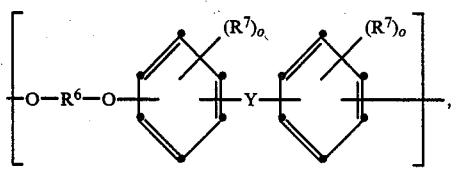

the percentages being based in each case on the total number of repeating structural units in each molecule, in which formulae I and II above R$^1$ is hydrogen or a radical of formulae III to IV

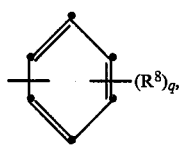

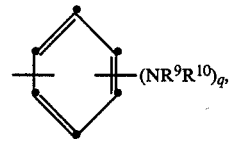

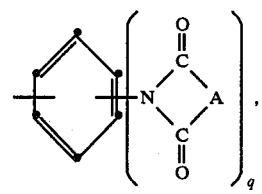

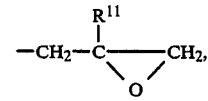

R$^2$ is a direct C-C bond or a group of formula —C$_r$H$_{2r}$—, —O—, —S—, —CO— or —SO$_2$—, r is 1 to 20, R$^3$ is hydrogen or methyl, R$^4$, R$^5$ and R$^7$ are each independently of one another C$_1$-C$_4$alkyl, C$_1$-C$_4$-alkoxy or chloro or bromo, m, n and o are each independently of one another 0, 1 or 2, p is 1 or 2, R$^6$ is a divalent radical of a bisphenol after removal of both phenolic hydroxyl groups, which radical is unsubstituted or substituted by one or two C$_1$-C$_4$alkyl or C$_1$-C$_4$alkoxy groups or chlorine or bromine atoms, X and Y are each independently of the other —CO— or —SO$_2$—, R$^8$ is vinyl, ethynyl, allyl, methallyl, prop-1-enyl or 2-methylprop-1enyl, R$^9$ and R$^{10}$ are each independently of the other hydrogen, allyl or methallyl, R$^{11}$ is hydrogen or methyl, q is 1 or 2, A is a group of formula VII or VIII

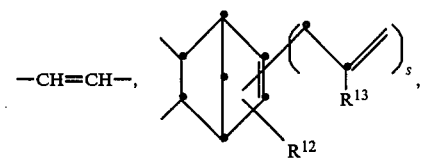

wherein

R$^{12}$ and R$^{13}$ are each independently of the other hydrogen or methyl, and s is 0, 1 or 2.

These copolyether resins can be used as intermediates and for the preparation of curable compositions which additionally contain at least one compound of formula XIa, IXb or IXc

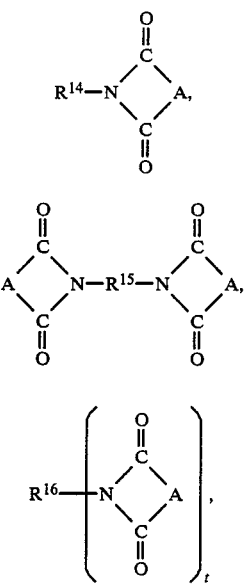

(IXa)

(IXb)

(IXc)

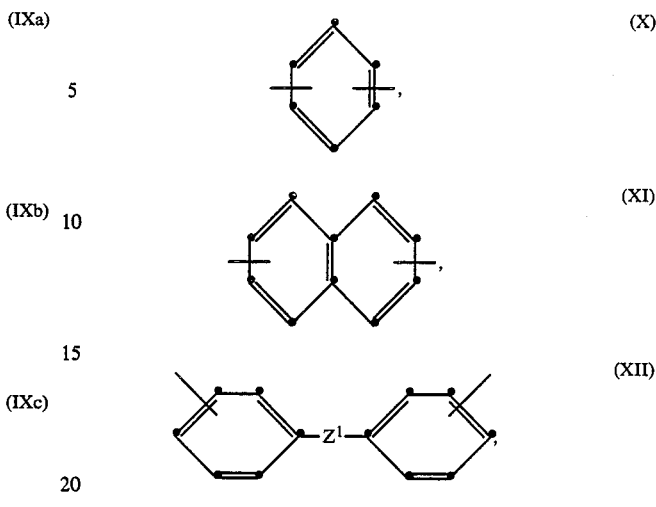

(X)

(XI)

(XII)

wherein
A is as defined above,
t is an integer from 3 to 12,
$R^{14}$ is $C_1$-$C_{20}$alkyl, $C_5$-$C_{12}$cycloalkyl, $C_6$-$C_{18}$aryl, $C_7$-$C_{20}$aralkyl or a $C_4$-$C_{18}$heterocycle containing one or two N, S or O atoms,
$R^{15}$ is $C_2$-$C_{20}$alkylene, $C_5$-$C_{12}$cycloalkylene, $C_6$-$C_{18}$arylene, $C_7$-$C_{20}$aralkylene or a divalent $C_4$-$C_{18}$heterocyclic radical containing one or two N, O or S atoms, and
$R^{16}$ is a radical of valency t of an aromatic polyamine after removal of the t amino groups.

The copolyether resins may also, however, themselves be crosslinked. Accordingly, the invention also relates to the use of the copolyether resins for the preparation of crosslinked products.

$R^1$ is preferably hydrogen or a radical of formula IV, wherein $R^9$ and $R^{10}$ are each hydrogen and q is 1.

The indices p and q are preferably 1 and the index r is preferably 1 to 6, most preferably 1.

$R^2$ is preferably —$CH_2$—, —$C(CH_3)_2$—, —O— or —S—.

$R^3$ is preferably hydrogen.

The radicals —CH=C($R^3$)—$CH_3$ in formula I are preferably each in orthoposition to the respective phenolic O atom.

$R^4$, $R^5$ and $R^7$ as $C_1$-$C_4$alkyl are in straight chain or branched chain configuration and are, for example, methyl, ethyl, n-propyl, isopropyl or n-butyl. Methyl is preferred.

$R^4$, $R^5$ and $R^7$ as $C_1$-$C_4$alkoxy are in straight chain or branched chain configuration and are, for example, methoxy, ethoxy, n-propoxy, isopropoxy or n-butoxy. Methoxy is preferred.

The indices m, n and o are preferably 0.

$R^6$ as divalent radical of a bisphenol is usually the divalent radical of a mononuclear or polynuclear carbocyclic-aromatic phenol, preferably the radical of a mononuclear or binuclear carbocyclic-aromatic phenol, both aromatic nuclei of which are fused or linked to each other through a bridging group.

Preferred radicals $R^6$ are those of formulae X to XII wherein $Z^1$ is a direct C—C bond or a group of formula —$C_rH_{2r}$—, wherein r is as defined above, —O—, —S—, —$SO_2$—, —CO—, —$C(CF_3)_2$—, —$CH(C_6H_5)$—, —P(O)$R^{17}$— or a group of formula XIII or XIV (XIII)

(XIV)

and $R^{17}$ is methyl, cyclohexyl or phenyl.

Particularly preferred radicals $R^6$ are those of formulae X, XI and XII, wherein $Z^1$ is a direct C—C bond or a group of formula —$CH_2$—, —$CHCH_3$—, —$C(CH_3)_2$—, —$CH(C_2H_5)$—, —$C(CH_3)(C_2H_5)$—, —$C(CF_3)_2$—, —O—, —S—, —$SO_2$— or —P(O)$R^{17}$—.

X and Y preferably have the same meaning.

$R^8$ is preferably allyl, methallyl, prop-1-enyl or 2-methylprop-1-enyl, most preferably allyl or methallyl.

$R^9$ and $R^{10}$ are preferably hydrogen.

$R^{11}$ is preferably hydrogen.

A is preferably a radical of formula VII or a radical of formula VIII, wherein s is 1.

$R^{12}$ and $R^{13}$ are preferably hydrogen and s is preferably 1 or 2, most preferably 1.

Preferred copolyether resins are those in which m, n and o are O and p and q are 1.

Other preferred copolyether resins are those in which $R^{12}$ and $R^{13}$ are hydrogen and s is 1.

Still more preferred copolyether resins are those in which X and Y each have the same meaning.

Particularly preferred copolyether resins are those in which $R^1$ is hydrogen or a group of formula III to V.

Among these last mentioned copolyether resins, those compounds are especially preferred in which $R^1$ is hydrogen or a group of formula IV, q is 1, and $R^9$ and $R^{10}$ are hydrogen.

The most preferred copolyether resins are those consisting of 2 to 30 mol %, more particularly 5 to 20 mol %, of repeating structural units of formula I, and 98 to 70 mol %, preferably 95 to 80 mol %, of repeating structural units of formula II, and having an average molecular weight (number average) of 2000 to 30 000, preferably from 5000 to 20 000.

The copolyether resins of this invention having hydroxyl end groups can be obtained by reacting compounds of formula XV and/or XVI and compounds of formulae XVII to XIX in a polar aprotic solvent and in the presence of a base:

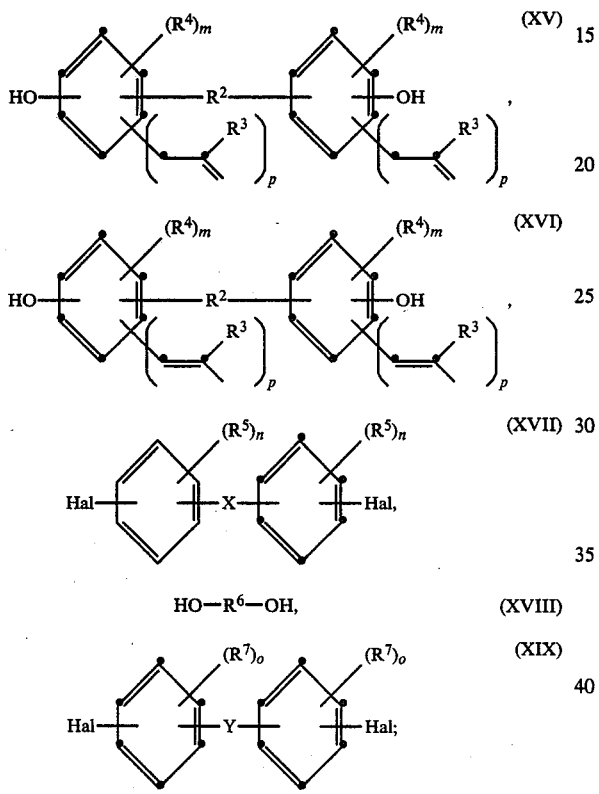

in which formulae above $R^2$ to $R^7$, X and Y and the indices m, n, o and p are as previously defined and Hal is a fluorine, chlorine, bromine or iodine atoms, preferably a chlorine atom in the sulfones and a fluorine atom in the ketones.

If a compound of formula XV is used, then isomerisation takes place during the reaction to give the appropriate 1-propenyl derivative. To prepare the hydroxyl-terminated copolyether resins ($R^1$=hydrogen, the ratios of the bisphenols to dihalo compounds are to be chosen in a manner known per se such that the bisphenol components are present in a small excess of stoichiometric proportion. The molar ratio of compounds XV/XVII or XVI/XVII to the compounds XVIII/XIX is normally 1:99 to 1:1.

However, the dihalo compounds can also be used in a small excess of stoichiometric proportion and the halogen-terminated copolyether resins so obtained subsequently modified by reaction with an alkali metal hydroxide such as aqueous sodium hydroxide.

The solvent will normally be a polar aprotic compound, for example dimethyl formamide or dimethylacetamide.

A suitable base is preferably an inorganic base such as NaOH, KOH or $K_2CO_3$.

The reaction of the bisphenols with the aromatic dihalo compounds to polyarylene ethers is known per se and described, for example, in European patent application A-106 023.

If it is desired to prepare end-capped copolyether resins ($R^1 \neq$ hydrogen), then these are conveniently prepared by carrying out the reaction in one step. This reaction is described, for example, in the above mentioned European patent application A- 67 976.

The reaction is carried out by charging the reactor with the appropriate dihalo compounds of formulae XVII and XIX in a small excess of stoichiometric proportion together with the bisphenols of formulae XV and/or XVI and XVIII, and reacting these simultaneously with monophenols of formulae XX to XII,

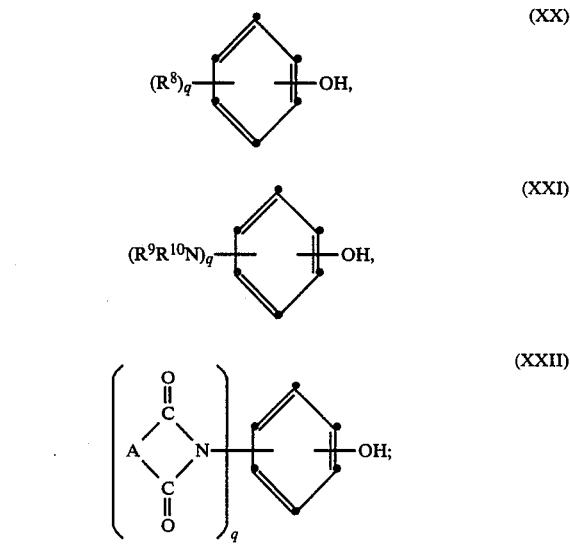

wherein $R^8$ to $R^{10}$ and A as well as the index q are as previously defined above, so that the dihalo-terminated polymers so obtained can be endcapped with said monophenols.

Glycidyl-terminated copolyether resins are obtained in a manner known per se by reacting the appropriate hydroxyl-terminated polymers with epichlorohydrin or with β-methylepichlorohydrin in the presence of a base.

The intermediates of formulae XV to XIX are known per se or can be prepared by methods which are known per se.

Thus the 1-propenyl derivatives of formula XVI can be prepared from the appropriate (meth)allyl derivatives of formula XV by isomerisation in the presence of alkali. Examples of such reactions will be found in European patent application A-14 816.

The (meth)allyl derivatives of formula XV can be obtained from the appropriate (meth)allyl ethers of the bisphenols by Claisen rearrangement. Examples of such reactions will also be found in European patent application A-14 816.

Some of the bisphenols of formula XVIII and the dihalo compounds of formulae XVII and XIX are commercially available. These compounds are already known as components for synthesising polyarylene ethers and are disclosed, for example, in European patent application A-106 023.

The functionalised monophenols of formulae XX to XXII are also known per se.

The compounds of formula XXI, wherein at least one of $R^9$ and $R^{10}$ is allyl or methallyl, can be obtained, for example, by reacting allyl or methallyl chloride with the corresponding aminophenols. The preparation of compounds of the formula XXII type is described, for example, in European patent application A-67 976.

The compounds of formula IXa to IXc are also known per se and some are commercially available.

The maleimidyl compounds of formulae IXa to IXc can be prepared, for example, by methods analogous to those described in U.S. patent specification 3 522 271. Maleimidyl compounds of formula IXc are described, for example, in German Offenlegungsschrift 2 230 874.

The corresponding bicyclo[2.20]hept-5-ene-2,3-dicarboximide derivatives, or the allyl- or methallyl-substituted derivatives of this type, can be obtained by methods analogous to those employed for preparing the maleimidyl compounds by using the appropriate bicyclo[2.2.1]hept-5-ene2,3-dicarboxylic anhydrides. Compounds of this type are disclosed, for example, in U.S. patent specification 4 515 962.

A particular advantage of the copolyether resins of this invention resides in the feature that they may be used and processed by themselves or together with unsaturated imides of formulae IXa to IXc in the conventional manner for thermoplastics, and that, after curing, they exhibit the characteristic properties of thermoset resins, such as good strength and high glass transition temperatures. The invention also relates to the use of the copolyethers for the preparation of crosslinked products.

The curable copolyether resins or compositions containing these compounds can be used, for example as moulding or coating compounds or for making films. Prior to processing, conventional modifiers such as fillers, pigments, stabilisers or reinforcing agents, for example carbon, boron or glass fibres, can be added to the polyether resins obtained in the form of moulding powders, melts, or solutions in a customary organic solvent. The curable copolyether resins or compositions containing them can also be processed together with the other thermoplastics such as polyesters, polyamides, polyimides, polyolefins or polyurethanes, in particular with the conventional polyether resins.

The copolyether resins of the present invention are preferably employed as matrix resins for the preparation of fibrous composite structures employing, as reinforcement fibres, the fibres conventionally used for reinforcing moulding materials. These fibres may be organic or inorganic fibres, natural fibres or synthetic fibres, as for example aramide fibres, and may be in the form of bundles or continuous filaments. Exemplary of reinforcement fibres employed are glass, asbestos, boron, carbon and metal fibres, with carbon and metal fibres being preferred. Such fibres and fabrics made therefrom are commercially available.

As mentioned at the outset, the curable copolyether resins or compositions containing them are crosslinkable. If the copolyether resins or compositions containing them are heat crosslinked, this heat crosslinking may be effected in the presence of oxygen or, after previous oxidation, by treatment with oxygen, also under anaerobic conditions, e.g. in a laminating press.

The temperature for the heat crosslinking is normally in the range from 220°-350° C., preferably from 250°-300° C.

The heat crosslinking can, if desired, be carried out in the presence of radical formers, e.g. inorganic or organic peroxides such as potassium peroxide sulfate or benzoyl peroxide, azo compounds such as azoisobutyronitrile, organic hydroperoxides such as cumene hydroperoxide or tertbutyl hydroperoxide, α-haloacetophenone, benzoin or ethers thereof, benzophenone, benzopinacol, benzil acetals, anthraquinones, arsines, phosphines, thioureas, redox initiator systems, anaerobic initiator systems or metal salts.

Crosslinking of the curable copolyether resins or compositions containing these compounds by actinic radiation can be effected, for example, with X-rays, accelerated electrons, with γ-rays emitted from a $^{60}$Co source, or with UV rays.

The invention is illustrated by the following Examples.

(A) PREPARATORY EXAMPLES

EXAMPLE 1

A 6 liter sulfonating flask fitted with propeller mixer, thermometer, water separator, intensive condenser and gas inlet pipe is charged with 439.9 g (1.532 mol) of 4,4'-dichlorodiphenylsulfone, 297.2 g (1.302 mol) of 2,2-bis(4-hydroxyphenyl)propane, 94.4 g (0.306 mol) of 2,2-bis(3-allyl-4-hydroxyphenyl)propane, 254.3 g (1.84 mol) of anhydrous pulverised potassium carbonate, 2.5 l of dimethylacetamide and 1 l of xylene, and the mixture is reacted for 2 hours at 146° C. while continuously removing the water of reaction as an azeotrope. Then solvent is distilled off until the temperature of the reaction mixture is 150° C. The reaction mixture is thereafter kept for 20 hours at this temperature and solvent is once more subsequently removed by distillation until the temperature of the mixture has risen to 157° C. After a further 65 minutes, 2 l of dimethylacetamide are added, the reaction mixture is cooled to room temperature and then charged into 15 l of water to precipitate the reaction product, while stirring intensively with a turbine impeller. The precipitate is filtered with suction, washed thoroughly with water and dried under vacuum at 100° C., to give 713.8 g (99.1 % of theory) of a colourless powder which dissolves in methylene chloride to form a clear solution.

Analytical data:

gel chromatography: $M_n = 6954$; $M_w = 30082$; $M_w/M_n = 4.32$.

glass transition temperature ($T_g$ onset, TMA): 115° C.

| elemental analysis: | calculated | found |
|---|---|---|
| | 6.82% S | 6.79% S. |

EXAMPLE 2

In accordance with the procedure of Example 1, 458.38 g (1.596 mol) of 4,4'-dichlorodiphenylsulfone, 260.22 g (1.14 mol) of 2,2-bis(4-hydroxyphenyl)propane, 164.42 g (0.532 mol) of 2,2-bis(3-allyl-4-hydroxyphenyl)propane, 254.0 g (1.84 mol) of anhydrous pulverised potassium carbonate, 2.5 l of dimethylacetamide and 1 l of xylene are reacted and worked up as described in Example 1A). Yield: 750.2 g (97.9 % of theory) of a colourles polysulfone which dissolves in methylene chloride to form a clear solution.

Analytical data:

gel chromatography: $M_n=7395$; $M_w=36393$; $M_w/M_n=4.92$.

glass transition temperature ($T_g$ onset, TMA): 107° C.

| elemental analyis: | calculated | found |
|---|---|---|
|  | 6.5% S | 6.68% S. |

EXAMPLE 3

In accordance with the procedure described in Example 1, 215.0 g (0.75 mol) of 4,4'-dichlorodiphenylsulfone, 126.3 g (0.625 mol) of 4,4'-dihydroxydiphenyl ether, 77.0 g (0.25 mol) of 2,2-bis(3-allyl-4-hydroxyphenyl)propane, 124.3 g (0.90 mol) of anhydrous potassium carbonate, 1000 ml of dimethylacetamide and 500 ml of xylene are reacted for 51 hours and 45 minutes at 141°–159° C. Working up affords 355.4 g (97.6 % of theory) of a pale brown polysulfone.

Analytical data:
gel chromatography: $M_n=4607$; $M_w=13253$; $M_w/M_n=2.88$.
hydrogen uptake: 1.2 mmol/g.

EXAMPLE 4

215.0 g (0.75 mol) of 4,4'-dichlorodiphenylsulfone, 144.6 g (0.675 mol) of 4,4'-dihydroxybenzophenone, 46.2 g (0.15 mol) of 2,2-bis(3-allyl-4-hydroxyphenyl)propane, 124.3 g (0.9 mol) of anhydrous potassium carbonate, 1300 ml of dimethylacetamide and 500 ml of xylene are reacted in accordance with the procedure described in Example 1. Working up gives 350.8 g (99.9 % of theory) of a polysulfone for which the analytical data are as follows:
gel chromatography: $M_n=3133$; $M_w=8995$; $M_w/M_n=2.87$.

EXAMPLE 5

In accordance with the procedure described in Example 1, 229.2 g (0.798 mol) of 4,4'-dichlorodiphenylsulfone, 125.7 g (0.551 mol) of 2,2-bis(4-hydroxyphenyl)propane, 82.2 g (0.266 mol) of 2,2-bis(3-allyl-4-hydroxyphenyl)propane and 132.2 g (0.9576 mol) of anhydrous potassium carbonate in 1300 ml of dimethylacetamide and 500 ml of xylene are reacted for 47 hours and 50 minutes at 147°–160° C. and worked up. Yield: 373.2 g (98.5 % of theory) of a colourless polysulfone which dissolves in methylene chloride to form a clear solution.

Analytical data:
gel chromatograpy: $M_n=10399$; $M_w=46356$; $M_w/M_n=4.457$.

| elemental analysis: | calculated | found |
|---|---|---|
|  | 6.75% S | 6.71% S |

EXAMPLE 6

In accordance with the procedure described in Example 1, 51.92 g (0.2378 mol) of 4,4'-difluorobenzophenone, 50.25 g (0.2201 mol) of 2,2-bis(4-hydroxyphenyl)propane, 7.34 g (0.0238 mol) of 2,2-bis(3-allyl-4-hydroxyphenyl)propane and 39.47 g (0.255 mol) of anhydrous potassium carbonate in 450 ml of dimethylacetamide and 189 ml of xylene are reacted for 16 hours and 5 minutes at 144°–150° C. Working up as described in Example 1 affords 96.2 g (96.2 % of theory) of a colourless polyether ketone.

Gel chromatography: $M_n=12184$; $M_w=47782$; $M_w/M_n=3.92$.

EXAMPLE 7

In accordance with the procedure described in Example 1, 215.0 g (0.75 mol) of 4,4'-dichlorodiphenylsulfone, 144.6 g (0.675 mol) of 4,4'-dihydroxybenzophenone, 46.2 g (0.15 mol) of 2,2-bis(3-allyl-4-hydroxyphenyl)propane and 124.3 g (0.90 mol) of anhydrous potassium carbonate are reacted for 44 hours and 10 minutes at 145°–161° C. Working up as described in Example 1 affords 350.8 g (99.9 % of theory) of a brownish pulysulfone in powder form which dissolves in methylene chloride to form a clear solution.

| elemental analysis: | calculated | found |
|---|---|---|
|  | 6.84% S | 6.28% S | gel chromatography: $M_n=3133$; $M_w=8995$; $M_w/M_n=2.87$.

EXAMPLE 8

In accordance with the procedure described in Example 1, 19.01 g (0.0832 mol) of 2,2-bis(4-hydroxyphenyl)propane, 11.67 g (0.0728 mol) of 2,7-dihydroxynaphthalene, 22.46 g (0.0728 mol) of 2,2-bis(3-allyl-4-hydroxyphenyl)propane and 62.78 g (0.2168 mol) of 4,4'-dichlorodiphenylsulfone in 350 ml of dimethylacetamide and 150 ml of xylene are reacted for 22 hours and 15 minutes at 145°–160° C. The product is isolated as in Example 1. Yield: 93.2 g (93.2 % of theory) of a polysulfone for which the analytical data are as follows:

| elemental analysis: | calculated | found |
|---|---|---|
|  | 6.91% S | 7.01% S | gel chromatography: $M_n=6130$; $M_w=29751$; $M_w/M_n=4.854$.

EXAMPLE 9

26.51 g (0.1655 mol) of 2,7-dihydroxynaphthalene, 23.82 g (0.0772 mol) of 2,2-bis(3-allyl-4-hydroxyphenyl)propane, 66.55 g (0.2317 mol) of 4,4'-dichlorodiphenylsulfone and 38.43 g (0.2781 mol) of anhydrous potassium carbonate in 350 ml of dimethylacetamide and 150 ml of xylene are reacted and worked up as described in Example 8. Yield: 82.6 g (82.6 % of theory) of a grey polymer for which the analytical data are as follows:

| elemental analysis: | calculated | found |
|---|---|---|
|  | 7.43% S | 7.40% S | gel chromatography: $M_n=6708$; $M_w=32119$; $M_w/M_n=4.79$.

EXAMPLE 10

In accordance with the procedure described in Example 1, 215.3 g (0.75 mol) of 4,4'-dichlorodiphenylsulfone, 158.2 g (0.693 mol) of 2,2-bis(4-hydroxyphenyl)propane, 23.1 g (0.075 mol) of 2,2-bis(3-allyl-4-hydroxyphenyl)propane and 124.4 g (0.90 mol) of potassium carbonate in 1300 ml of dimethylacetamide and 500 ml of xylene are reacted for 48 hours and 15 minutes at 142°–157° C. Working up as in Example 1 gives 333.4 g (97.5 % of theory) of the desired polysulfone for which the analytical data are as follows:

| elemental analysis: | calculated | found |
|---|---|---|
| | 7.03% S | 7.11% S | gel chromatography: $M_n = 10009$; $M_w = 45979$; $M_w/M_n = 4.59$.

EXAMPLE 11

472.3 g (1.4049 mol) of hexafluorobisphenol A, 448.2 g (1.561 mol) of 4,4'-dichlorodiphenylsulfone, 96.2 g (0.3122 mol) of 2,2-bis(3-allyl-4-hydroxyphenyl)propane and 258.8 g (1.873 mol) of anhydrous potassium carbonate in 2.5 l of dimethylacetamide and 1 l of xylene are reacted for 26 hours at 142°–150° C. as described in Example 1. Working up gives 849.6 g (99.6 % of theory) of the desired polysulfone for which the analytical data are as follows:

gel chromatography: $M_n = 5423$; $M_w = 16008$; $M_w/M_n = 2.95$.

(B)
USE EXAMPLES
EXAMPLE I 100 g of polysulfone (prepared according to Example 1) and 15 g of bis(4-maleimidylphenyl)methane are homogenised for 10 minutes in an automatic mortar (®Pulverisette). About 10 g of the powder so obtained are applied to an eloxated aluminium sheet, which is then pressed at 200° C. for 2 minutes in a laboratory press to a 0.5 mm thin sheet. Quarters of this sheet are each polymerised for 6 hours at 250° C., for 6 hours at 280° C. and for 6 hours at 310° C. The properties of the polymer are reported in Table 1.

EXAMPLE II 100 g of polysulfone (prepared according to Example 2) and 25 g of bis(4-maleimidylphenyl)methane are processed and polymerised as described in Example I. The properties of the polymer are reported in Table 1.

EXAMPLE III 50 g of the copolymer according example 1 are dissolved at room temperature in 200 g of dichloromethan. A "quasi-unidirectional" carbon fibre fabric containing 95 % of carbon fibres in warp direction and 5 % glass fibres in weft direction is impregnated with this solution at room temperature by means of a ductor. After evaporation of the solvent (at least 24 hours at room temperature) a dry prepreg is obtained. Thirteen layers of this prepreg are arranged in superimposed layers and are transferred into a laminate in a press at about 210° C. and under a pressure of 7 bar. After curing this for six hours at 280° C. a laminate with the following properties is obtained:

| fibre content: | 63,5% b.wt. |
|---|---|
| interlaminar shear strength ILSS acc. to DIN 29971: | 80 MPa |
| flexural strength in principal fibre direction: | 1550 Mpa |
| flexural strength transverse to principal fibre direction: | 102 MPa |

EXAMPLE IV

When following the procedure of example III but using 50 g of the copolymer according to example 2 instead of the copolymer of example 1 a laminate with the following properties is obtained:

| fibre content: | 62,8% b.wt. |
|---|---|
| interlaminar shear strength ILSS acc. to DIN 29971: | 80 MPa |
| flexural strength in principal fibre direction: | 1687 MPa |
| flexural strength transverse to principal fibre direction: | 115 MPa |

What is claimed is:

1. A copolyether resin having end groups -OR[1] linked direct to phenyl nuclei and containing 1 to 50 mol % of repeating structural units of formula I

TABLE 1

The glass transition temperatures of the polymers are determined by thermomechanical analysis (TMA) using a Mettler TA-3000, and the solvent resistance is determined in methylene chloride.

| Example | Curing Test | 2 min. 200° C. | 6 h 250° C. | 6 h 280° C. | 6 h 310° C. |
|---|---|---|---|---|---|
| B1 | $T_g^1$ onset [TMA, °C.] | 115 | 182 | 189 | 192 |
| | $T_g^1$ [TMA, °C.] | 124 | 187 | 194 | 202 |
| | aspect | yellowish | reddish | reddish-brown | dark |
| | resistance in methylene chloride after 10 days | dissolved | swelled | insoluble | insoluble |
| B2 | $T_g^1$ onset [TMA, °C.] | 107 | 197 | 194 | 202 |
| $T_g^1$ | [TMA, °C.] | 114 | 212 | 208[1] | 215[1] |
| | aspect | yellowish | reddish | reddish-brown | dark |
| | resistance in methylene chloride after 10 days | dissolved | slightly swelled | insoluble | insoluble |

[1]$T_g$ determination by TMA: recording the penetration depth of a detecting element as function of the sample temperature.
$T_g$ value = minimum of the 1st derivation of the curve.
$T_g$ onset value = point of intersection of the extended base line with the tangent at the calibration curve in the area of the steepest ascent.

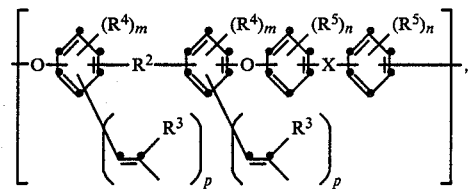

and 99 to 50 mol % of repeating structural units of formula II

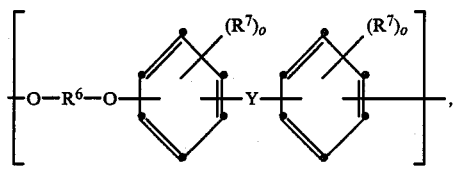

the percentages being based in each case on the total number of repeating structural units in each molecule, in which formulae I and II above $R^1$ is hydrogen or a radical of formulae III to IV

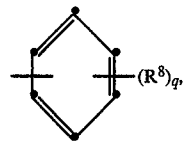

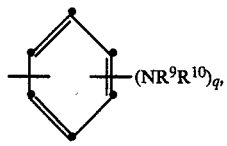

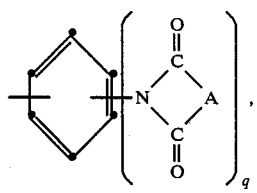

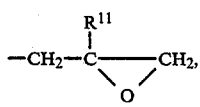

$R^2$ is a direct C—C bond or a group of formula $-C_rH_{2r}-$, $-O-$, $-S-$, $-CO-$ or $-SO_2-$, r is 1 to 20, $R^3$ is hydrogen or methyl, $R^4$, $R^5$ and $R^7$ are each independently of one another $C_1-C_4$alkyl, $C_1-C_4$-alkoxy or chloro or bromo, m, n and o are each independently of one another 0, 1 or 2, p is 1 or 2, $R^6$ is a divalent radical of a bisphenol after removal of both phenolic hydroxyl groups, which radical is unsubstituted or substituted by one or two $C_1$-$C_4$alkyl or $C_1$-$C_4$alkoxy groups or chlorine or bromine atoms, X and Y are each independently of the other $-CO-$ or $-SO_2-$, $R^8$ is vinyl, ethynyl, allyl, methallyl, prop-1-enyl- or 2-methylprop-1enyl, $R^9$ and $R^{10}$ are each independently of the other hydrogen, allyl or methallyl, $R^{11}$ is hydrogen or methyl, q is 1 or 2, A is a group of formula VII or VIII

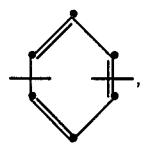

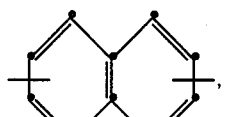

wherein $R^{12}$ and $R^{13}$ are each independently of the other hydrogen or methyl, and s is 0, 1 or 2.

2. A copolyether resin according to claim 1, wherein $R^6$ is a radical of formula X, XI or XII

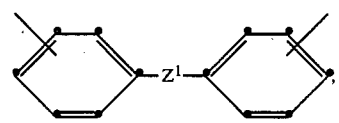

wherein $Z^1$ is a direct C—C bond or a group of formula $-CH_2-$, $-CHCH_3-$, $-C(CH_3)_2-$, $-CH(C_2H_5)-$, $-C(CH_3)(C_2H_5)-$, $-C(CF_3)_2-$, $-O-$, $-S-$, $-SO_2-$ or $-P(O)R^{17}-$ and $R^{17}$ is methyl, cyclohexyl or phenyl.

3. A copolyether resin according to claim 1, wherein m, n and o is 0 and p and q are 1.

4. A copolyether resin according to claim 1, wherein $R^{12}$ and $R^{13}$ are hydrogen and s is 1.

5. A copolyether resin according to claim 1, wherein X and Y each have the same meaning.

6. A copolyether resin according to claim 1, wherein $R^1$ is hydrogen or a group of formulae III to V.

7. A copolyether resin according to claim 6, wherein $R^1$ is hydrogen or a group of formula IV, q is 1 and $R^9$ and $R^{10}$ are hydrogen.

8. A copolyether resin according to claim 1, consisting of 2 to 30 mol % of repeating structural units of formula I and of 98 to 70 mol % of repeating structural units of formula II and having an average molecular weight (number average) of 2000 to 30,000.

9. A cured product obtainable by heating or by irradiating a copolyether as claimed in claim 1 with actinic light.

* * * * *